UNITED STATES PATENT OFFICE.

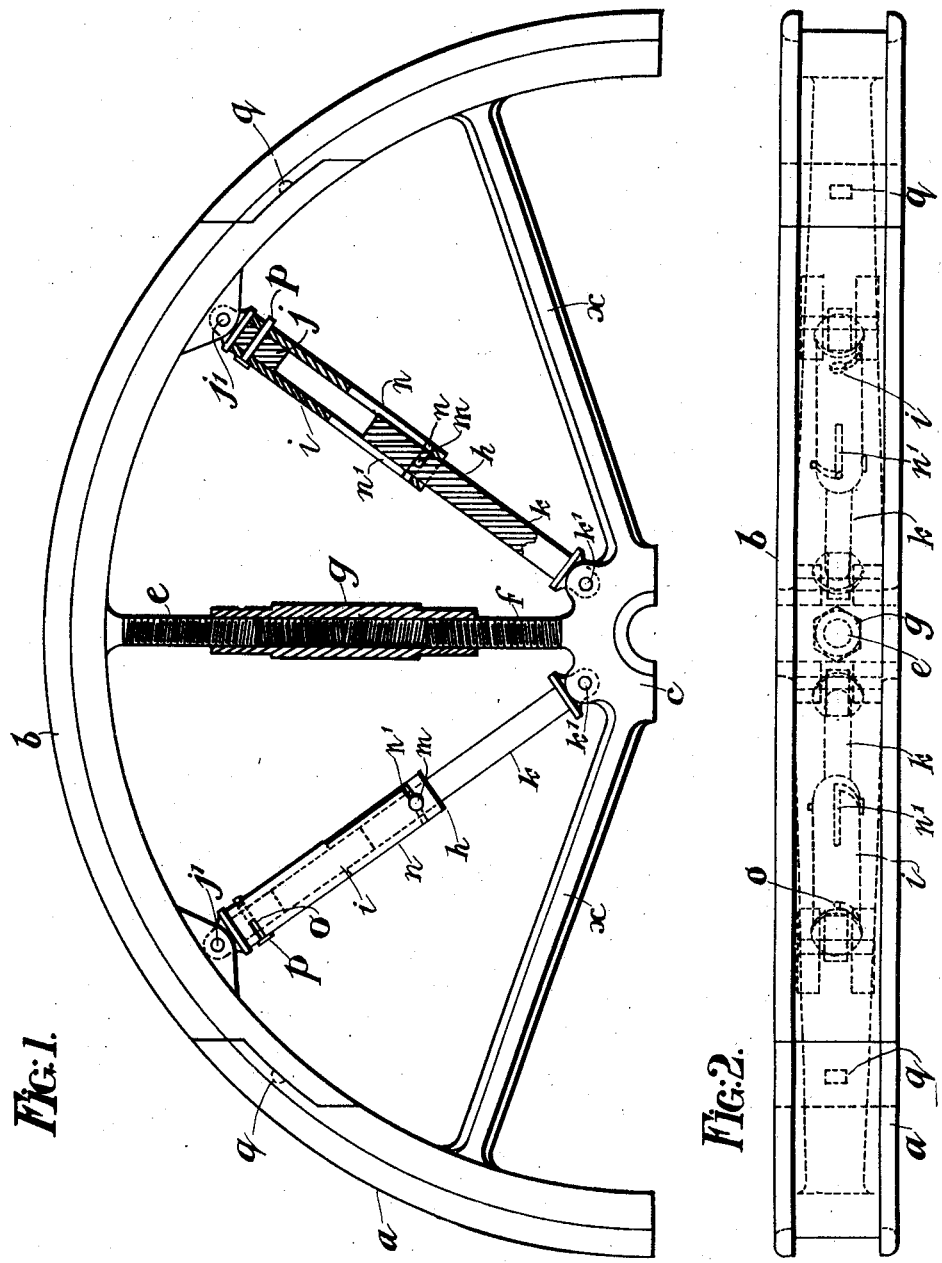

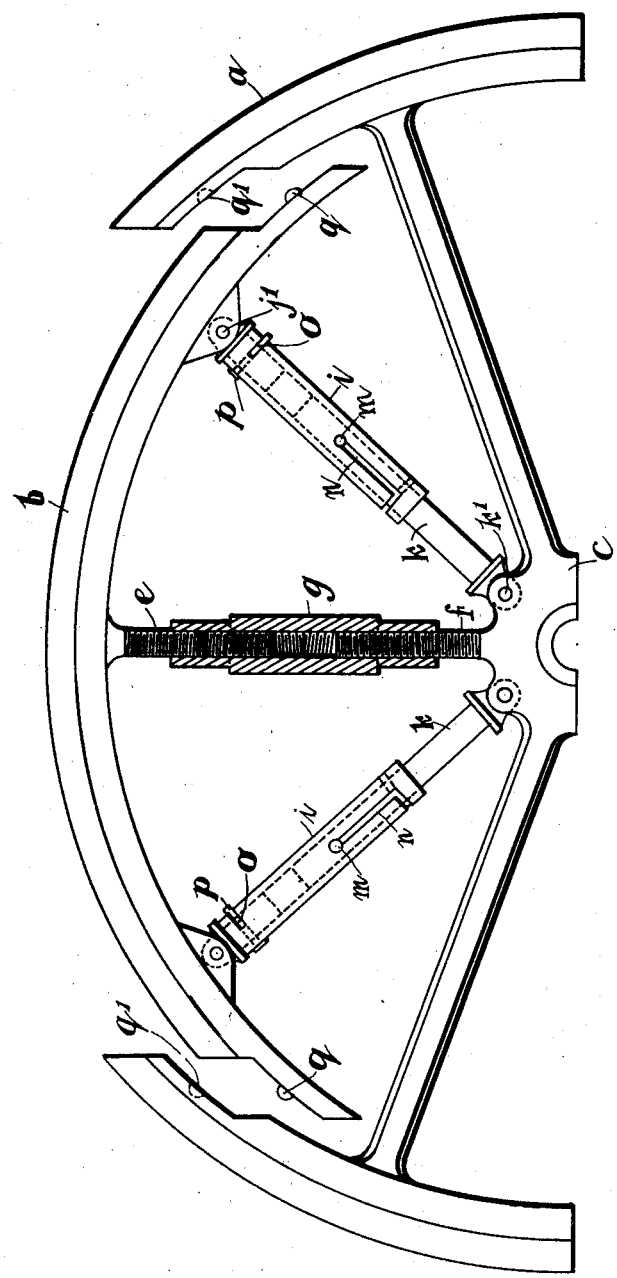

SAMUEL OSWALD WILLIAMS, OF NORTHUMBERLAND, ENGLAND.

ROAD-WHEEL FOR VEHICLES.

1,392,545.  Specification of Letters Patent.  Patented Oct. 4, 1921.

Application filed March 31, 1921. Serial No. 457,229.

*To all whom it may concern:*

Be it known that I, SAMUEL OSWALD WILLIAMS, merchant, a subject of the King of England, of Northumberland, England, have invented certain new and useful Improvements in Road-Wheels for Vehicles, of which the following is a specification.

The invention relates to improvements in road wheels for vehicles designed for partial collapse of the rim to enable the tire to be more readily removed and fitted, and the invention broadly stated, consists in providing a wheel of this character the rim of which comprises a movable section supported by radially adjustable spoke members in such manner that said section may be moved inward from normal position toward the center of the wheel, such displacement, by reducing the effective circumference of the rim, enabling the tire to be readily attached and detached as required.

An embodiment of the invention is shown in the accompanying drawings, in which:—

Figure 1 shows one half of the improved wheel, partly in section, and with the movable section in normal position.

Fig. 2 is a plan view of Fig. 1, and

Fig. 3 is a similar view to Fig. 1 but showing the rim section inwardly displaced.

The wheel, as shown, consists of a rim $a$ of conventional beaded type and comprising fixed spokes $x$, said rim including the section $b$ which normally forms a continuation of the remaining portion of the rim, as shown in Fig. 1. The movable rim section $b$ is connected to the hub of the wheel centrally by an axially adjustable spoke member comprising two rods $e, f$ fixed to the section $b$ and hub $c$ respectively and connected at their adjacent ends by a nut $g$, said nut engaging right and left hand screwed portions of the rods. The section $b$ is further supported by two similar telescopic spoke members $h$, each comprising a rotatable sleeve $i$ which embraces co-axial spoke portions $j, k$ hinged at $j^1, k^1$ respectively to the rim section and hub $c$ this pivotal connection being such that the spoke members are free to move in the plane of the wheel during adjustment.

The sleeve $i$ is connected to the member $k$ by a pin and slot connection, consisting of a pin $m$ on the member engaging at both ends two diametrically opposite L shaped slots $n$ $n^1$ in the inner end of the sleeve. The upper end of the sleeve $i$ is provided with slots $o$ $o^1$ in which engages a pin $p$ fixed to the spoke portion $j$, whereby limited turning movement of the sleeve is permitted without axial movement relatively to the member $j$.

The action of the device is as follows: To move the section inward for attachment and detachment of a tire, the sleeves $i$ are turned by hand to bring the longitudinal parts of the slots $n$ in alinement with the pins $m$ (see Fig. 3) thus allowing axial movement of the sleeves relatively to the members $k$, whereupon the nut $g$ is rotated which results in the section being drawn inward to the open position shown in Fig. 3. The tire having been applied, reverse rotation of the nut $g$ will obviously return the section to its original position (Fig. 1) whereupon the sleeves $i$ are turned back to bring the transverse parts of the slots $n$ $n^1$ in engagement with the pins $m$ so that the sleeves $i$ and members $k$ are locked against relative axial movement.

Lateral stability of the section $b$ in its closed position is effected by the provision of projections or keys $q$ on such section normally engaging in corresponding recesses $q^1$ in the underside of the rim $a$. In lieu of this tongue and recess connection, or in addition thereto, the ends of the section may be cut irregularly to form an interlock with correspondingly shaped ends of the rim portion $a$.

The bed of the rim is covered by a strong band of canvas as usual, that portion of the canvas covering the section $b$ being unattached thereto to allow the section to move as required, or the section may have a separate covering of canvas, the canvas on the portion $a$ of the rim being in this case sufficiently long to overlap the joint between the ends of the section $b$ and the rim portion $a$.

It will be noted that I do not limit myself to the particular telescopic arrangement of the spoke members as shown and described, nor to the particular mechanism $g, e\ f$ for effecting adjustment, since these may be modified structurally without departing from the spirit of the invention.

What I claim as my invention and desire to secure by Letters Patent of the United States is:—

In a road wheel for vehicles, a rim section adapted to be movable inward relatively to the remaining portion of the rim and radially adjustable spoke members supporting said movable rim section and designed to provide for such movement thereof, certain of said spoke members comprising elements rigid with the rim and wheel hub, and oppositely threaded for engagement by a nut, and others of said spoke members comprising elements pivoted to the rim and wheel hub and telescopically arranged within a sleeve, and means for detachably connecting said sleeve and elements.

In witness whereof I have signed this specification in the presence of two witnesses.

SAMUEL OSWALD WILLIAMS.

Witnesses:
J. G. HADDAN,
A. MASON.